(12) United States Patent
Hartog

(10) Patent No.: US 9,429,450 B2
(45) Date of Patent: *Aug. 30, 2016

(54) MEASURING BRILLOUIN BACKSCATTER FROM AN OPTICAL FIBRE USING DIGITISATION

(75) Inventor: Arthur H. Hartog, Hampshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1909 days.

This patent is subject to a terminal disclaimer.

(21) Appl. No.: 12/377,548

(22) PCT Filed: Aug. 7, 2007

(86) PCT No.: PCT/GB2007/002996
§ 371 (c)(1),
(2), (4) Date: Dec. 31, 2009

(87) PCT Pub. No.: WO2008/020170
PCT Pub. Date: Feb. 21, 2008

(65) Prior Publication Data
US 2014/0268110 A1    Sep. 18, 2014

(30) Foreign Application Priority Data

Aug. 16, 2006 (GB) .................... 0616268.9

(51) Int. Cl.
*G01D 5/353* (2006.01)
*G01K 11/32* (2006.01)
*G01M 11/00* (2006.01)

(52) U.S. Cl.
CPC ...... *G01D 5/35364* (2013.01); *G01M 11/3145* (2013.01); *G01K 2011/322* (2013.01); *G01M 11/3109* (2013.01)

(58) Field of Classification Search
None
See application file for complete search history.

(56) References Cited

U.S. PATENT DOCUMENTS

| 5,767,956 | A  | * | 6/1998 | Yoshida | 356/73.1 |
| 6,055,044 | A  | * | 4/2000 | Uchiyama et al. | 356/73.1 |
| 6,335,788 | B1 | * | 1/2002 | Uchiyama et al. | 356/73.1 |
| 6,700,655 | B2 | * | 3/2004 | Uchiyama | G01M 11/319 356/73.1 |
| 7,480,460 | B2 | * | 1/2009 | Colpitts | G01B 11/16 374/E11.015 |
| 7,499,151 | B2 | * | 3/2009 | Bao | G01K 11/32 356/35.5 |

(Continued)

FOREIGN PATENT DOCUMENTS

WO    2005/106396 A2    11/2005

OTHER PUBLICATIONS

Optics Communications vol. 250 (2005). M. Song and B. Zhao, "Accuracy enhancement in Brillouin scattering distributed temperature sensor based on Hilbert transform".

(Continued)

*Primary Examiner* — Gordon J Stock, Jr.
(74) *Attorney, Agent, or Firm* — David J. Groesbeck

(57) ABSTRACT

A method for measuring Brillouin backscattering from an optical fiber, comprising mixing backscattered light received from the optical fiber and having a Brillouin frequency fβ(t) with coherent light at a frequency f i in an optical detector to produce an electrical signal with a difference frequency ΔF(t)=fβ(t)–f15 and directly digitizing the electrical signal using an analog-to-digital converter to generate a sequence of samples representing the electrical signal, the samples then being processed to determine one or more properties of the Brillouin spectral line. The difference frequency may be further reduced by an additional frequency mixing stage to allow digitization at a lower sampling rate.

15 Claims, 2 Drawing Sheets

(56) References Cited

U.S. PATENT DOCUMENTS

| | | | |
|---|---|---|---|
| 7,504,618 B2* | 3/2009 | Hartog | G01J 3/4412 250/227.14 |
| 7,515,273 B2* | 4/2009 | Bernini | G01D 5/268 356/477 |
| 8,013,986 B2* | 9/2011 | Hartog | 356/73.1 |
| 8,134,696 B2* | 3/2012 | Hartog | G01D 5/35364 356/73.1 |
| 8,144,314 B2* | 3/2012 | Yamamoto | G01K 11/32 356/73.1 |
| 8,988,671 B2* | 3/2015 | Zhang | G01K 11/32 356/73.1 |
| 2001/0050768 A1 | 12/2001 | Uchiyama et al. | |
| 2007/0171402 A1* | 7/2007 | Watley et al. | 356/73.1 |

OTHER PUBLICATIONS

GB0616268.9, Combined Search & Exam Report dated Dec. 5, 2006, 3 pgs.

PCT/GB2007/002996, International Search Report and Written Opinion, dated Feb. 4, 2008, 7 pgs.

Alahbabi, M.N., et al. "High spatial resolution microwave detection system for Brillouin-based distributed temperature and strain sensors", Measurement Science & Technology, 2004, 15(8), pp. 1539-1543.

H.H. Kee, et al, "All-Fiber system for simultaneous interrogation of distributed strain and temperature sensing by spontaneous Brillouin scattering", Optics Letters, 2000, 25(10), pp. 695-697.

Maugham, S.M., et al., "A calibrated 27-km distributed fiber temperature sensor based on microwave heterodyne detection of spontaneous Brillouin backscattered power" IEEE Photonics Technology Letters, 2001, 13(5), pp. 511-513, 2001.

Parker, T., et al., "Simultaneous distributed measurement of strain and temperature from noise-initiated Brillouin scattering in optical fibers" IEEE Journal of Quantum Electronics, 1998, 34(4), pp. 645-659.

* cited by examiner

MEASURING BRILLOUIN BACKSCATTER FROM AN OPTICAL FIBRE USING DIGITISATION

BACKGROUND OF THE INVENTION

1. Field of the Invention

The present invention relates to a method for measuring Brillouin backscattered light from an optical fibre used for optical time domain reflectometry, the method utilising digitisation. The invention further relates to apparatus for performing the method.

2. Description of Related Art

Optical time domain reflectometry (OTDR) is a technique that uses optical fibre to make remote measurements of various parameters. A probe pulse of light is launched into an end of a fibre that is deployed through a region of interest, for example down an oil well. The pulse propagates along the fibre, and part of the light is backscattered from points along the length of the fibre and returns to the launch end, where it is detected. The propagation time to the scattering point and back is recorded as the light returns, so the location of the scattering point can be calculated using the speed of propagation in the fibre. Also, various physical parameters such as temperature, strain, and pressure have an effect on how the light is scattered, including producing Raman and Brillouin frequency shifts. The value of the parameters can be calculated from the size, width, and intensity of these frequency shifts. Thus, by making the appropriate conversion from time to distance, a map of the distribution of a physical parameter along the fibre length can be obtained.

In Brillouin-based OTDR, one or more Brillouin lines are measured in the scattered light spectrum. These lines are shifted in frequency from the frequency of the probe pulse. From a measured Brillouin spectrum, one can extract at least the intensity of the line or lines and the size of the frequency shift, and use this information to determine physical parameters along the fibre.

Conventionally, Brillouin signals have been measured by direct detection, where the Brillouin light is incident directly on a photodetector, or by heterodyne detection, in which the Brillouin signal is mixed with a signal from a local oscillator and the resulting difference frequency signal is passed for detection.

One measurement technique uses optical discrimination, in which an optical filter switches light between the two arms of a Mach-Zehnder interferometer, and an estimate of the central frequency of the Brillouin line is obtained from the relative intensities of the optical signals emerging from each arm [1]. A similar procedure relies instead on electrical discrimination [2].

A problem with discriminator-based techniques is the need to employ a wide input frequency spectrum to capture the full range of potential output signal frequencies. The necessary broad bandwidth tends to degrade performance.

Other techniques are based on frequency scanning and recording an intensity/time signal for each scan position. For example, one may scan an optical filter across the expected frequency spectrum before passing the filtered light to a detector. The optical filter may be a Fabry-Perot interferometer that is scanned slowly compared with the pulse repetition frequency of the probe pulses. For each pulse a series of intensity measurements is made as a function of time/distance along the fibre, and may be further averaged over several pulses. A series is recorded for every position of the filter, from which a Brillouin spectrum for each location along the fibre can be constructed [3].

An alternative approach [4, 5] uses a microwave heterodyne method, in which the backscattered light is mixed on a photodiode, thus creating a beat frequency spectrum that shifts the information from the optical domain to the microwave domain. An electrical local oscillator is scanned in frequency and a microwave receiver section passes a fixed intermediate frequency that is further amplified, filtered and detected, thus creating a quasi-DC signal. The latter provides an indication of the power within the bandwidth of the system as a function of position along the fibre.

For these various scanning methods, the data acquisition time is typically slow, since the signals must be averaged in two dimensions. Depending on the sampling interval in the frequency offset domain and the span of frequencies to be covered, this can be a lengthy process during which essential but sparsely used information is acquired. A large frequency range must be looked at for each position along the fibre to ensure that the shifted frequency is found, but the frequency line itself occupies only a small part of that range. Measurements outside the line must be made to locate the line, but contain no information regarding the parameter being measured. In contrast, the discrimination methods, at least in the electrical domain, require an acceptance bandwidth that is much wider than the Brillouin signal to allow for the possible range of the frequency shift and thus suffer from increased noise.

BRIEF SUMMARY OF THE INVENTION

Accordingly, a first aspect of the present invention is directed to a method for measuring Brillouin backscattering from an optical fibre, comprising: launching a probe pulse of coherent light with a frequency $f_0$ into an optical fibre; receiving backscattered light from the optical fibre that includes at least one Brillouin spectral line at a frequency $f_B(t)$ shifted from $f_0$ by a Brillouin shift, the Brillouin spectral line varying with time/distance along the fibre; providing coherent light at a frequency $f_1$; mixing the received backscattered light at $f_B(t)$ with the coherent light at $f_1$ in an optical detector to generate an electrical signal at a difference frequency $\Delta F(t)=f_B(t)-f_1$; digitising the electrical signal using an analog to digital converter to sample the electrical signal at a sampling rate and hence generate a sequence of digital samples representing the electrical signal; and processing the digital samples to determine one or more properties of the Brillouin spectral line of the received backscattered light as a function of time/distance along the optical fibre.

Creation of an electrical signal for sampling that has a relatively low frequency by the use of difference frequency mixing allows the electrical signal to be sampled directly by an analog to digital converter without the need for any intervening detector or receiver. Receivers add noise and hence degrade the signal, reducing the accuracy of the final measurement, so removal of such components is highly beneficial. Manipulation of the frequency of the sampled signal in this way allows the direct digitisation to be carried out at a sampling rate that is fast enough for accurate Brillouin information to be extracted from the digital samples. Also important is the fact that all frequencies of interest are acquired in parallel and a considerable time saving is thus available.

For example, preferably the sampling rate is at least twice the highest anticipated value of the frequency $\Delta F(t)$ of the electrical signal.

Further, the difference frequency $\Delta F(t)$ may be less than 100 GHz.

The method may further comprise, before the step of digitising, mixing the electrical signal at the difference frequency $\Delta F(t)$ with a secondary electrical signal at a constant frequency $f_C$ to reduce the frequency of the electrical signal to a frequency $\Delta F_2(t)$ which is less than $\Delta F(t)$. This reduction in the frequency of the electrical signal allows the sampling rate to be reduced, putting fewer demands on the analog to digital converter and also reducing the amount of data generated so that the processing of the samples is less time-consuming. Measurement time hence goes down. For example, the frequency $\Delta F_2(t)$ may be less than 5 GHz.

Regarding the frequencies of the optical signals, $f_1$ may be equal to $f_0$. This is a convenient arrangement, since the probe pulses at the frequency $f_0$ and the coherent light at the frequency $f_1$ may be generated from a single optical source, the output of which is modulated to produce probe pulses.

Alternatively, a value of $f_1$ different from $f_0$ might be preferred so as to give a particular range of values of $\Delta F(t)$ having regard to the sampling rate of the analog to digital converter. Two separate optical sources can hence be used. For example, the method may comprise generating probe pulses from a first optical source and generating the coherent light at the frequency $f_1$ from a second optical source by modulating the output of one of the first optical source and the second optical source to generate modulation sidebands, and injection-locking the other of the first optical source and the second optical source to one of the modulation sidebands. Yet another approach is to modulate at least part of the output of a source at frequency $f_0$ so as to produce at least one sideband at frequency $f_1$.

The one or more properties of the Brillouin spectral line determined from the samples may include at least one of: the Brillouin frequency $f_B(t)$; the intensity of the Brillouin spectral line; and the linewidth of the Brillouin spectral line.

The method may further comprise calculating the value of one or more physical parameters to which the optical fibre is subject from the one or more determined properties of the Brillouin spectral line and converting time into distance along the optical fibre to obtain an indication of the distribution of the one or more physical parameters over the length of the optical fibre.

Additionally, the method may further comprise repeating the method for further probe pulses, and averaging over a plurality of probe pulses to obtain a more accurate determination of the one or more properties of the Brillouin spectral line and/or the one or more physical parameters.

A second aspect of the present invention is directed to apparatus for measuring Brillouin backscattering from an optical fibre comprising: a first optical source operable to generate probe pulses of coherent light at a frequency $f_0$ and launch probe pulses into an optical fibre; a second optical source operable to generate coherent light at a frequency $f_1$; an optical detector arranged to receive backscattered light from the optical fibre that includes at least one Brillouin spectral line at a frequency $f_B(t)$ shifted from $f_0$ by a Brillouin shift, the Brillouin spectral line varying with time/distance along the fibre, and to receive the coherent light at frequency $f_1$, and operable to generate an electrical signal at a difference frequency $\Delta F(t)=f_B(t)-f_1$ from frequency mixing of the received backscattered light at $f_B(t)$ and the coherent light at frequency $f_1$; an analog to digital converter arranged to receive the electrical signal, and operable to sample the electrical signal at a sampling rate to generate a sequence of digital samples representing the electrical signal; and a processor operable to process the digital samples to determine one or more properties of the Brillouin spectral line of the received backscattered light as a function of time/distance along the optical fibre.

BRIEF DESCRIPTION OF THE DRAWINGS

For a better understanding of the invention, and to show how the same may be carried into effect, reference is now made by way of example to the accompanying drawings in which.

DETAILED DESCRIPTION OF THE INVENTION

The present invention proposes measuring the Brillouin spectral component in backscattered light received from a deployed optical fibre by performing difference frequency mixing of the backscatter with a second optical signal. An optical detector is used as the frequency mixer, giving an electrical output with a difference frequency in the microwave domain. This frequency down-conversion allows digital sampling of the difference frequency, providing data in the form of digital samples from which properties of the Brillouin shift, and physical parameters causing the shift, can be conveniently determined. The sampling is performed directly on the electrical signal at the difference frequency, so avoiding problems associated with microwave detectors such as noise and bandwidth limitations, and giving a more accurate determination of the Brillouin properties.

First Example Embodiment

Figure 1:
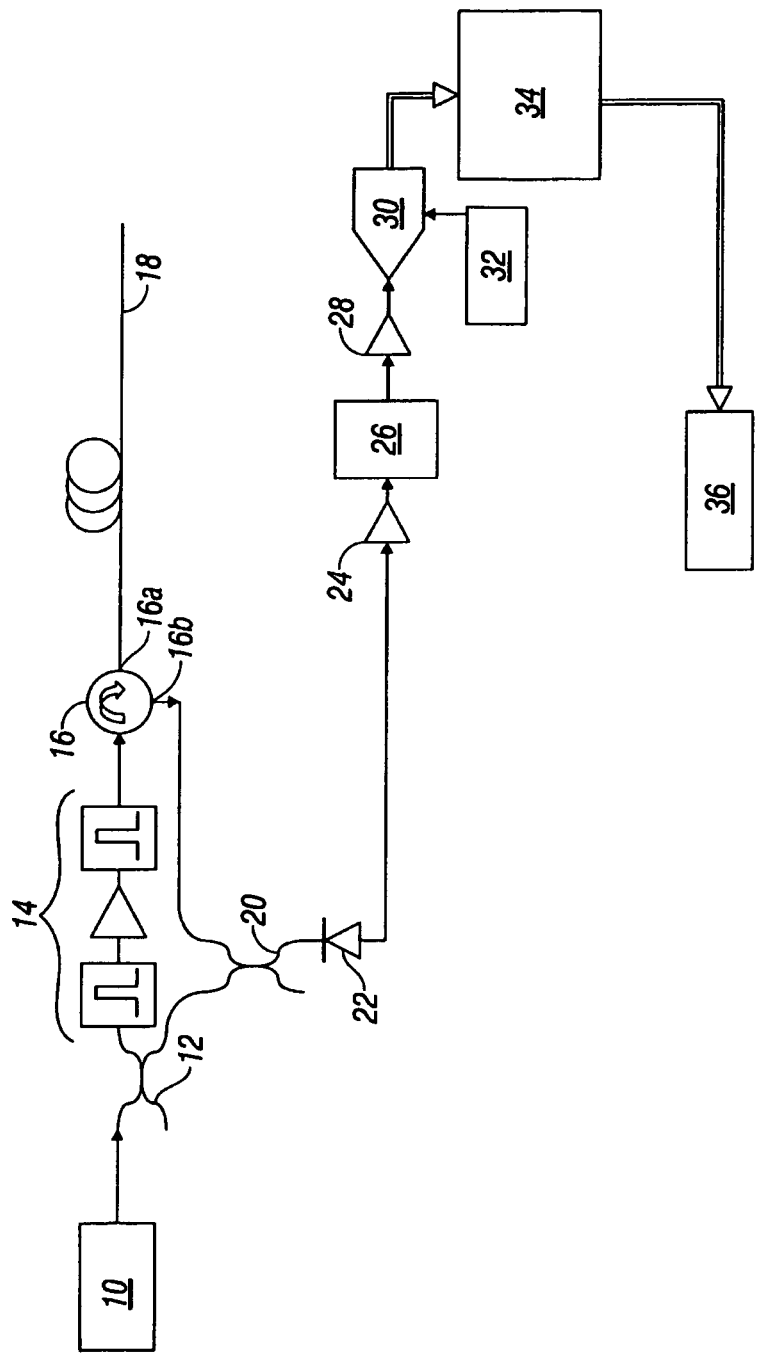
FIG. 1 shows a schematic representation of apparatus for carrying out a Brillouin backscatter measurement in accordance with a first embodiment of the present invention.

FIG. 1 shows a schematic representation of apparatus for implementing a measurement method according to an embodiment of the present invention.

An optical source 10 operable to generate narrow-band coherent light (such as a laser) produces an output beam at a frequency $f_0$. The beam is directed into a beam splitter 12 (such as a 3 dB fibre splitter) that divides the output beam into a first part for launching into a deployed optical fibre, and a second part to be mixed with light received back from the fibre. The first part passes through a pulse forming unit 14 that produces optical probe pulses of a desired repetition frequency, pulse duration and power, suitable for probing of the deployed fibre to obtain Brillouin backscatter. In this example the pulse forming unit 14 comprises two pulse generators/gates with an amplifier between; any required combination of optical components can be used to create the necessary output, though. The pulses at $f_0$ are then sent to an optical circulator 16 having a first port 16a to which is connected the deployed optical fibre 18. The pulses can thereby be launched into the optical fibre 18.

A second port 16b of the optical circulator 16 is connected to a beam combiner 20 (such as a 3 dB fibre splitter), which is also connected to receive the second part of the beam from the optical source 10 from the beam splitter 12. An output of the beam combiner 20 is arranged to direct light onto an optical detector 22 such as a fast photodiode.

In use, therefore, the optical source 10 generates an output beam that is divided into two parts. A first part passes through the pulse forming unit 14 to form probe pulses, which are launched into the optical fibre 18 via the first port 16a of the optical circulator 16. Each pulse propagates along the length of the optical fibre 18, with Brillouin backscatter being produced during propagation, from each part of the optical fibre 18. The backscatter returns to the launch end of the optical fibre 18, where it is received by the optical circulator 16 at the first port 16a, and directed out of the second port 16b and into the beam combiner 20. Optionally, the received backscatter may be amplified before it reaches the beam combiner 20. In the beam combiner 20, the received Brillouin backscatter combines with the second part of the output beam from the optical source 10, which is at frequency $f_0$. The Brillouin backscatter includes at least one Brillouin spectral line at a Brillouin frequency $f_B(t)$ shifted from $f_0$, where the time variation arises from the time-distance correspondence for light returned from the optical fibre and the variation in the Brillouin shift with location along the fibre (different parts of the fibre being at different temperatures, strains, etc.). The combined light mixes together (frequency mixing) and is directed onto the optical detector 22, which has an electrical output representative of light incident upon it. The frequency mixing therefore produces an electrical signal at a difference frequency $\Delta F(t)=f_B(t)-f_0$.

Although in this example the received Brillouin light is mixed with light from the optical source 10 at $f_0$ to produce the difference signal, a separate optical source could be used, either generating light at a different optical frequency $f_1$, or also generating light at the frequency $f_0$ ($f_1=f_0$). If a separate optical source is used, the first optical source producing light for the probe pulses may have its output modulated to generate modulation sidebands, and a second optical source for generating the light at $f_1$ to be mixed with the received Brillouin light is injection locked to one of the modulation side bands. Conversely, the second optical source may be modulated and the first optical source injection-locked thereto. In all cases the effect is the same: the mixing of the two optical signals produces an electrical signal having a lower frequency than the optical signals. Alternatively, the light from optical source 10 can be modulated between beam splitter 12 and beam combiner 20 and it is the mixing product between its modulation sidebands and the Brillouin signal that is used further in the processing chain. Preferably, $f_0$ and $f_1$ are chosen so that the frequency of the electrical signal, at the difference frequency $\Delta F(t)=f_B(t)-f_1$ (where $f_1$ may equal $f_0$) is less than about 100 GHz, i.e., the electrical signal is in the microwave domain. For example, if $f_0=f_1=1550$ nm, the difference frequency will be around 11 GHz.

Returning to FIG. 1, the apparatus further comprises a first amplifier 24, a bandpass filter 26 and a second amplifier 28 arranged to receive and transmit the electrical signal from the optical detector 22 to an analog-to-digital converter 30. The amplifiers 24, 28 are included as desired to enhance the power of the signal; this may not be necessary depending on the power of the returning backscatter and the power-handling capabilities of the analog-to-digital converter 30. The bandpass filter 26 is included to remove frequencies that are not relevant to the process of recovering the Brillouin shift information. Backscattered light returned from the optical fibre 18 will include a wide range of frequencies in addition to the Brillouin spectral lines. These will be represented in the electrical signal if they are passed to the optical detector 22. If an unfiltered electrical signal is then passed to the analog-to-digital converter 30, a substantial amount of extraneous data could be generated which is not of use in the subsequent data processing. Hence, it is useful to filter the electrical signal to deliver to the analog-to-digital converter 30 only frequencies within a bandwidth expected to contain the difference frequency $\Delta F(t)$ resulting from the Brillouin spectral line. Also, the bandpass filter 26 can remove some components of noise that may be produced by the optical detector 22.

The analog-to-digital converter 30 receives the electrical signal and generates a sequence of digital samples representing the electrical signal, by sampling the incoming electrical signal at a particular sampling rate. The analog-to-digital converter 30 has an associated clock 32 that controls the sampling rate, and can be used to synchronise the sampling with an event such as the probe pulse launch time, so that the conversion of time to distance required to obtain a distributed measurement from the optical fibre 18 can be conveniently made. Once generated, the samples are stored in a memory array 34 connected to the analog-to-digital converter 30, from which they can be read by a processor 36 configured to perform digital signal processing of the samples to extract properties of the Brillouin backscatter (intensity, frequency, linewidth, etc.) from the recorded digital data, and possibly further to determine from those properties the values of one or more physical parameters acting on the optical fibre 18 to cause the Brillouin shift (temperature, pressure, strain, etc.). The time variation of the data is converted to distance along the optical fibre 18 in order to provide distributed measurements.

The analog-to-digital converter 30 is preferably a high speed converter of at least 500 megasamples per second (MSPS), although a converter with a speed of 2 gigasamples per second (GSPS) is most appropriate for use in the apparatus of the invention. While a 500 MSPS converter may be suitable for a temperature monitoring application where the optical fibre is loose and the temperature range is limited to 0-200° C., in general a much higher speed converter will be required, especially if strain is also measured. This is not only because of the strain per se, but also because the strain-coupled cable design generally is more temperature sensitive, which further increases the frequency range that must be covered.

The use of a high speed analog-to-digital converter allows the electrical signal to be sampled at a sufficiently high rate that the desired Brillouin properties can be determined from the samples with a useful degree of accuracy. The sampling rate (number of samples acquired per unit time) of the converter defines both the spatial resolution with which the optical fibre can be interrogated, owing to the time-distance correspondence in optical time domain resolution systems, and the accuracy of the information which can be determined for each position along the fibre. Currently available high speed converters can sample at a rate of 2.2 GSPS with a 10 bit resolution, for example the Atmel AT84AS008. This specification is sufficient to cover a frequency range of 1 GHz with useful accuracy. The bit resolution determines the dynamic range that can be sampled. Higher sampling rates are available in converters with lower bit resolution, such as the Rockwell RAD006, which digitises with a 6 bit resolution up to a rate of 6 GSPS. If the Brillouin frequency is expected to span a range of about 700 MHz, the difference frequency $\Delta F(t)$ can be arranged to be centred at 500 MHz by appropriate selection of the two optical frequencies to give difference frequencies in the range 150-850 MHz. This range can be adequately sampled at 2 GSPS. Preferably the sampling rate is at least twice the largest expected value of the frequency $\Delta F(t)$ of the electrical signal.

For an individual probe pulse, the samples are generated at the chosen sampling rate, and then divided into time windows of a chosen duration, corresponding to a particular fibre segment length, each segment being at a different position along the fibre. The segment length defines the spatial resolution of the Brillouin measurement along the extent of the fibre. Within each time window, there are multiple samples from which the required Brillouin properties can be determined for the corresponding fibre position. For a given sampling rate, a larger window size gives more samples per window and hence more accurate values for the Brillouin properties, but with a correspondingly lower spatial resolution. Hence the need for a high sampling rate, to give a usefully large number of samples within the small window size required for high spatial resolution. Overlapping or sliding windows may be useful.

The Brillouin signal can be considered to be a burst of narrow band noise. The task of the digital processing performed on the recorded samples is to estimate at least one of the centre frequency $f_B$, the Brillouin intensity, and the line width for each resolvable position along the fibre. In the event that these properties cannot be determined with sufficient accuracy from the backscatter received from a single probe pulse, the method can be repeated for a plurality of probe pulses. A set of samples for each pulse can be stored in the memory array, and each set can be processed separately. The results of the processing can then be averaged over the probe pulses to improve the accuracy of the determined Brillouin properties and/or physical parameters. Note that the averaging is performed on the processed results, the raw digital samples cannot be averaged before processing.

Although any suitable signal processing can be used, it may be found to be useful to divide the processing into a fast pre-processing stage and a slower post-processing stage. The former can be implemented using a programmable logic device for real-time processing of the necessarily large amount of data generated by the analog-to-digital converter 30. The latter can be implemented using a dedicated digital signal processor or a conventional microprocessor.

Second Example Embodiment

Figure 2:
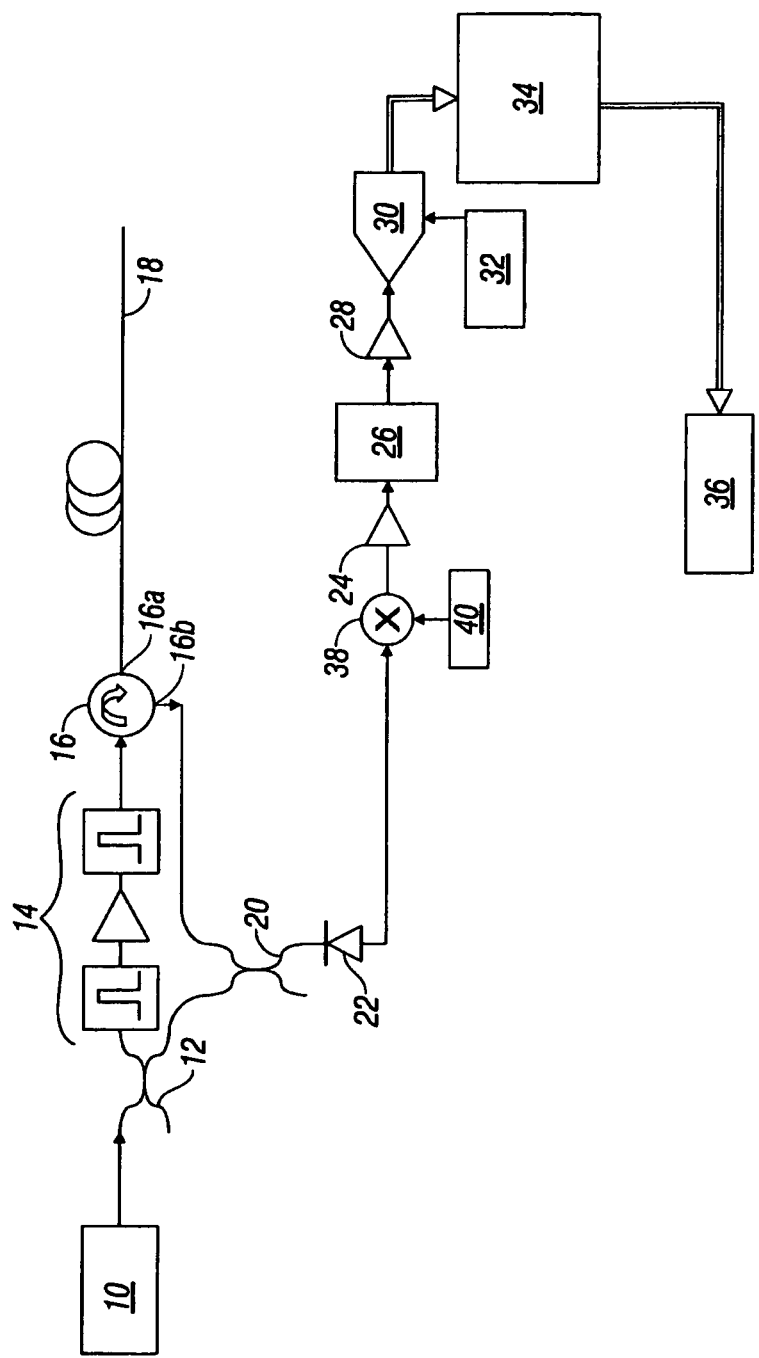
FIG. 2 shows a schematic representation of apparatus for carrying out a Brillouin backscatter measurement in accordance with a further embodiment of the present invention.

FIG. 2 shows a schematic representation of an alternative apparatus of the invention. This includes all the components shown in FIG. 1 (labelled with the same reference numerals) and additionally includes an electrical frequency mixer 38 with an associated electrical local oscillator 40 (such as a voltage controlled oscillator) from which the frequency mixer 38 receives an electrical signal. The frequency mixer 38 is configured to receive the electrical signal at the difference frequency $\Delta F(t)$ as an input and to deliver its output to the amplifier and filter arrangement (24, 26, 28) positioned before the analog-to-digital converter 30.

The local oscillator 40 is operable to produce a secondary electrical signal at a constant frequency $f_C$. The frequency mixer 38 mixes this secondary signal with the electrical signal from the optical detector 22 so that the difference frequency mixing down-converts the frequency of the electrical signal to a lower difference frequency $\Delta F_2(t)=\Delta F(t)-f_C$ before the electrical signal is digitised. Usefully, the frequency of the electrical signal is reduced to less than 5 GHz. A lower frequency can reduce noise, and puts lower demands on the analog-to-digital converter 30 so that a less costly converter may be used. Since the sampling rate is at least twice the highest anticipated value of the difference frequency be used; reducing $\Delta F(t)$ to $\Delta F_2(t)$ allows a slower sampling rate to be used. For currently available converters, this can give access to a correspondingly higher bit resolution.

Other Embodiments

The invention is not limited to the embodiments described with regard to FIGS. 1 and 2. Further frequency shifting stages may be introduced, in the optical and the microwave domains, by adding other sum or difference frequency mixing components. Various stages of filtering and/or amplifying (optical and electrical) may also be included as required.

For any embodiment, it is possible to perform multiple measurement cycles, i.e. repeat the measurement process for a plurality of probe pulses (with or without updating the tracking using the results of a previous measurement), and average the determined Brillouin properties and/or physical parameters to achieve an improved determination of the properties and/or parameters.

REFERENCES

[1] H. H. Kee, G. P. Lees and T. P. Newson, "All-fiber system for simultaneous interrogation of distributed strain and temperature sensing by spontaneous Brillouin scattering", *Optics Letters,* 2000, 25(10), pp 695-697.

[2] WO 2005/106396.

[3] T. Parker et al, "Simultaneous distributed measurement of strain and temperature from noise-initiated Brillouin scattering in optical fibers", *IEEE Journal of Quantum Electronics,* 1998, 34(4), pp 645-659.

[4] S. M. Maugham, H. H. Kee, and T. P. Newson, "A calibrated 27-km distributed fiber temperature sensor based on microwave heterodyne detection of spontaneous Brillouin backscattered power", *IEEE Photonics Technology Letters,* 2001, 13(5), pp 511-513.

[5] M. N. Alahbabi et al, "High spatial resolution microwave detection system for Brillouin-based distributed temperature and strain sensors" *Measurement Science & Technology,* 2004, 15(8), pp 1539-1543.

What is claimed is:

1. A method for measuring Brillouin backscattering from an optical fibre, comprising:

launching a probe pulse of coherent light with a frequency f0 into an optical fibre;

receiving backscattered light from the optical fibre that includes at least one Brillouin spectral line at a frequency fB(t) shifted from f0 by a Brillouin shift, the Brillouin spectral line varying with time and distance along the fibre;

providing coherent light at a frequency f1;

mixing the received backscattered light at fB(t) with the coherent light at f1 in an optical detector to generate an electrical signal at a difference frequency $\Delta F(t)=fB(t)-f1$;

digitising the electrical signal using an analog-to-digital converter to sample the electrical signal at a sampling rate and hence generate a sequence of digital samples representing the electrical signal;

processing the digital samples to determine one or more properties of the Brillouin spectral line of the received backscattered light as a function of time and distance along the optical fibre; and mixing the electrical signal at the difference frequency $\Delta F(t)$ with a secondary electrical signal at a constant frequency fC to reduce the frequency of the electrical signal to a frequency $\Delta F2(t)$ which is less than the difference frequency $\Delta F(t)$;

wherein the probe pulse is generated from a first optical source and the coherent light at the frequency f1 is generated from a second optical source by modulating an output of one of the first optical source and the second optical source to generate modulation sidebands and injection-locking the other of the first optical source and the second optical source to one of the modulation sidebands.

2. A method according to claim 1, in which the sampling rate is at least twice a highest anticipated value of the difference frequency $\Delta F(t)$ of the electrical signal.

3. A method according to any one of claim 1 or 2, in which f1=f0.

4. A method according to any one of claim 1 or 2, in which the one or more properties of the Brillouin spectral line determined from the digital samples include at least one of the Brillouin frequency fB(t); the intensity of the Brillouin spectral line; and the linewidth of the Brillouin spectral line.

5. A method according to any one of claim 1 or 2, and further comprising calculating a value of one or more physical parameters to which the optical fibre is subject from the one or more determined properties of the Brillouin spectral line and converting time into distance along the optical fibre to obtain an indication of a distribution of the one or more physical parameters over a length of the optical fibre.

6. A method according to any one of claim 1 or 2, and further comprising repeating the method for further probe pulses, and averaging over a plurality of probe pulses to obtain a determination of the one or more properties of the Brillouin spectral line and/or one or more physical parameters.

7. A method according to claim 1 or claim 2, in which the difference frequency $\Delta F(t)$ is less than 100 GHz.

8. A method according to claim 7, in which the frequency $\Delta F2(t)$ is less than 5 GHz.

9. Apparatus for measuring Brillouin backscattering from an optical fibre comprising:

a first optical source operable to generate probe pulses of coherent light at a frequency f0 and launch probe pulses into an optical fibre;

a second optical source operable to generate coherent light at a frequency f1;

an optical detector arranged to receive backscattered light from the optical fibre that includes at least one Brillouin spectral line at a frequency fB(t) shifted from f0 by a Brillouin shift, the Brillouin spectral line varying with time and distance along the fibre, and to receive the coherent light at frequency f1, and operable to generate an electrical signal at a difference frequency $\Delta F(t)$=fB(t)−f1 from frequency mixing of the received backscattered light at fB(t) and the coherent light at frequency f1;

an analog-to-digital converter arranged to receive the electrical signal, and operable to sample the electrical signal at a sampling rate to generate a sequence of digital samples representing the electrical signal; and a processor operable to process the digital samples to determine one or more properties of the Brillouin spectral line of the received backscattered light as a function of time and distance along the optical fibre, wherein the processor is further operable to calculate a value of one or more physical parameters to which the optical fibre is subject from the one or more determined properties of the Brillouin spectral line and convert time into distance along the optical fibre to obtain an indication of a distribution of the one or more physical parameters over a length of the optical fibre;

wherein an output of one of the first optical source and second optical source is modulated to generate modulation sidebands, and the other of the first optical source and the second optical source is injection-locked to one of the modulation sidebands.

10. Apparatus according to claim 9, in which the sampling rate is at least twice a highest anticipated value of the frequency $\Delta F(t)$ of the electrical signal.

11. Apparatus according to claim 9, in which the difference frequency $\Delta F(t)$ is less than 100 GHz.

12. Apparatus according to claim 9, in which f1=f0.

13. Apparatus according to claim 9, in which the one or more properties of the spectral line determined from the digital samples include at least one of: the Brillouin frequency fB(t); the intensity of the Brillouin spectral line; and the linewidth of the Brillouin spectral line.

14. Apparatus according to claim 9, and further comprising an electrical local oscillator operable to generate a secondary electrical signal at a constant frequency fC, and an electrical signal mixer operable to frequency mix the electrical signal at the difference frequency $\Delta F(t)$ with the secondary electrical signal to reduce the frequency of the electrical signal to a frequency $\Delta F2(t)$ which is less than $\Delta F(t)$ before the analog-to-digital converter receives the electrical signal.

15. Apparatus according to claim 14, in which the frequency $\Delta F2(t)$ is less than 5 GHz.

\* \* \* \* \*